US012297688B2

(12) United States Patent
Aity et al.

(10) Patent No.: US 12,297,688 B2
(45) Date of Patent: May 13, 2025

(54) METHOD TO DETECT LOCK BOX SHACKLE BREAKAGE OR ATTEMPTED BREAKAGE AND ACTIVATE ALERT

(71) Applicant: CARRIER CORPORATION, Palm Beach Gardens, FL (US)

(72) Inventors: Rakesh Aity, Telangana (IN); Rajesh Athelly, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 75 days.

(21) Appl. No.: 18/192,086

(22) Filed: Mar. 29, 2023

(65) Prior Publication Data

US 2023/0313596 A1 Oct. 5, 2023

Related U.S. Application Data

(60) Provisional application No. 63/325,878, filed on Mar. 31, 2022.

(51) Int. Cl.
*G08B 13/00* (2006.01)
*E05B 17/10* (2006.01)
(Continued)

(52) U.S. Cl.
CPC ................ *E05G 1/10* (2013.01); *E05B 17/10* (2013.01); *E05B 17/22* (2013.01); *E05B 39/04* (2013.01);
(Continued)

(58) Field of Classification Search
USPC ............ 340/541, 542, 545.1, 546, 547, 548, 340/545.6–545.8, 572.1, 593, 596,
(Continued)

(56) References Cited

U.S. PATENT DOCUMENTS 5,587,702 A * 12/1996 Chadfield ............ E05B 45/005
70/DIG. 49
5,727,405 A 3/1998 Cromwell
(Continued)

FOREIGN PATENT DOCUMENTS

CN 109921363 A 6/2019
EP 0704587 A1 4/1996
(Continued)

OTHER PUBLICATIONS

Author Unknown; "Alpha (Taiwan) MF01A Membrane Force Sensors"; Mouser Electronics; Oct. 19, 2020; 4 Pages. https://www.mouser.com/new/taiwan-alpha/alpha-mf01a-membrane-force-sensors/.

(Continued)

*Primary Examiner* — Daniel Previl
(74) *Attorney, Agent, or Firm* — CANTOR COLBURN LLP

(57) ABSTRACT

A method of monitoring a lock box. The method includes detecting a magnitude of a force being applied to a shackle of the lock box using a shackle force sensor; determining whether the magnitude of the force exceeds a selected magnitude, the selected magnitude being a predetermined force that indicates an individual is tampering with the shackle; and generating an alert if the magnitude of the force exceeds the selected magnitude.

16 Claims, 5 Drawing Sheets

(51) Int. Cl.

| | |
|---|---|
| ***E05B 17/22*** | (2006.01) |
| ***E05B 39/04*** | (2006.01) |
| ***E05B 45/06*** | (2006.01) |
| ***E05G 1/00*** | (2006.01) |
| ***E05G 1/10*** | (2006.01) |
| *E05B 47/00* | (2006.01) |

(52) U.S. Cl.
CPC .............. *E05B 45/06* (2013.01); *E05G 1/005* (2013.01); *E05B 2047/0067* (2013.01); *E05B 2047/0095* (2013.01)

(58) Field of Classification Search
USPC ................................. 340/636.12, 686.1, 687
See application file for complete search history.

(56) References Cited

U.S. PATENT DOCUMENTS

| | | | | |
|---|---|---|---|---|
| 7,543,467 | B2 | 6/2009 | Sheehan | |
| 8,149,119 | B2 | 4/2012 | Hanft | |
| 8,482,411 | B1 | 7/2013 | Brown | |
| 8,631,636 | B2 | 1/2014 | Khrakovsky et al. | |
| 9,115,511 | B1 * | 8/2015 | Schmidt | E05B 45/005 |
| 10,641,013 | B2 | 5/2020 | Yates et al. | |
| 2003/0057663 | A1 * | 3/2003 | Trescott | B60P 1/027 280/5.514 |
| 2007/0159297 | A1 | 7/2007 | Paulk et al. | |
| 2009/0167526 | A1 | 7/2009 | Graves et al. | |
| 2010/0253519 | A1 * | 10/2010 | Brackmann | B60P 3/03 340/572.1 |
| 2012/0068817 | A1 * | 3/2012 | Fisher | G07C 9/00571 340/5.61 |
| 2020/0285726 | A1 * | 9/2020 | Kalous | H04L 63/0853 |

FOREIGN PATENT DOCUMENTS

| | | | |
|---|---|---|---|
| WO | 2007059161 | A1 | 5/2007 |
| WO | 2017079743 | A1 | 5/2017 |
| WO | 2020154738 | A2 | 7/2020 |

OTHER PUBLICATIONS

Author Unknown; "FlexiForce A201-100 Force Sensor"; Electronicscomp.com; 2023; 3 Pages. https://www.electronicscomp.com/flexiforce-a201-100-force-sensor.

Author Unknown; "FlexiForce FlexiPot Strip Position Sensor"; Electronicscomp.com; 2023; 3 Pages. https://www.electronicscomp.com/flexiforce-flexipot-strip-position-sensor?gclid=EAIaIQobChMIiPHN7f6K9AIV7JJmAh05CA1yEAYYASABEgJqPPD_BWE.

Author Unknown; "Force-Sensing Linear Potentiometer: 4.0?×0.4? Strip, Customizable Length"; Pololu Corporation; 2001-2023; 6 Pages. https://www.pololu.com/product/2730.

Author Unknown; "Ohmite FSR Force-Sensing Resistors"; Mouser Electronics; Mar. 15, 2018; 3 Pages. https://www.mouser.com/new/ohmite/ohmite-fsr-force-resistors/.

* cited by examiner

METHOD TO DETECT LOCK BOX SHACKLE BREAKAGE OR ATTEMPTED BREAKAGE AND ACTIVATE ALERT

CROSS-REFERENCE TO RELATED APPLICATIONS

This application claims the benefit of U.S. Provisional Application No. 63/325,878 filed Mar. 31, 2022, all of which are incorporated herein by reference in their entirety.

BACKGROUND

The embodiments herein generally relate to lock boxes and more specifically, a method and apparatus to detect tampering with the lock box.

Lock boxes are typically used to a provide a secured storage area for a property access tool (e.g., key, the access card, or other access aid) at a location close to a locked property (e.g., at a front door to a residential home) accessible by the property access tool. In this way, an authorized user can unlock the secured storage area, obtain the property access tool and then use the property access tool to unlock the locked property. Although the locked property may be a residential home, it is envisioned that the locked property may be any space that is locked while unattended by a traditional lock that requires a property access tool. For example, the locked property may be a commercial or industrial site, or other type of property.

The lock box is typically attached to a door handle or to another stationary object near the traditional lock. The lock box is typically configured to require the user to demonstrate that the user is authorized to obtain access to the locked property before the secured storage area is unlocked to allow the user to obtain the property access tool. In a mechanical lock box, the user might be required to enter a correct lock combination to access the secured storage area. In an electronic lock box, the user might be required to communicate a credential to the lock box (via a physical connection to the lock box or via a wireless link to the lock box) to access the secured storage area.

BRIEF DESCRIPTION

According to one embodiment, a method of monitoring a lock box is provided. The method including: detecting a magnitude of a force being applied to a shackle of the lock box using a shackle force sensor; determining whether the magnitude of the force exceeds a selected magnitude, the selected magnitude being a predetermined force that indicates an individual is tampering with the shackle; and generating an alert if the magnitude of the force exceeds the selected magnitude.

In addition to one or more of the features described above, or as an alternative, further embodiments of may include transmitting the alert to a mobile computing device.

In addition to one or more of the features described above, or as an alternative, further embodiments of may include detecting when a mobile computing device is within a short-range wireless transmission range of the lock box; and transmitting the alert to the mobile computing device when the mobile computing device is within the short-range wireless transmission range of the lock box.

In addition to one or more of the features described above, or as an alternative, further embodiments of may include transmitting the alert to a home computing device, the home computing device being configured to relay the alert to a mobile computing device via the internet.

In addition to one or more of the features described above, or as an alternative, further embodiments of may include adjusting an indicator light on the lock box based on the alert.

In addition to one or more of the features described above, or as an alternative, further embodiments of may include that the shackle force sensor is embedded in the shackle.

In addition to one or more of the features described above, or as an alternative, further embodiments of may include that the shackle force sensor is attached to the shackle.

According to another embodiment, a method of monitoring a lock box is provided. The method including: detecting a magnitude of a force being applied to a mounting location of the lock box using a mounting location force sensor; determining whether the magnitude of the force exceeds a selected magnitude, the selected magnitude being a predetermined force that indicates an individual is tampering with the mounting location; and generating an alert if the magnitude of the force exceeds the selected magnitude.

In addition to one or more of the features described above, or as an alternative, further embodiments of may include transmitting the alert to a mobile computing device.

In addition to one or more of the features described above, or as an alternative, further embodiments of may include: detecting when a mobile computing device is within a short-range wireless transmission range of the lock box; and transmitting the alert to the mobile computing device when the mobile computing device is within the short-range wireless transmission range of the lock box.

In addition to one or more of the features described above, or as an alternative, further embodiments of may include transmitting the alert to a home computing device, the home computing device being configured to relay the alert to a mobile computing device via the internet.

In addition to one or more of the features described above, or as an alternative, further embodiments of may include adjusting an indicator light on the lock box based on the alert.

In addition to one or more of the features described above, or as an alternative, further embodiments of may include that the mounting location force sensor is embedded in the mounting location.

In addition to one or more of the features described above, or as an alternative, further embodiments of may include that the mounting location force sensor is attached to the mounting location.

In addition to one or more of the features described above, or as an alternative, further embodiments of may include that the mounting location is a door handle.

According to another embodiment, a breakage detection system for a lock box is provided. The breakage detection system including: a shackle force sensor attached to or embedded within a shackle of the lock box, the shackle force sensor being configured to detect a magnitude of a force being applied to a shackle of the lock box; a controller configured to determine whether the magnitude of the force exceeds a selected magnitude, the selected magnitude being a predetermined force that indicates an individual is tampering with the shackle, wherein the controller is configured to generate an alert if the magnitude of the force exceeds the selected magnitude.

In addition to one or more of the features described above, or as an alternative, further embodiments of may include the controller is configured to transmit the alert to a mobile computing device.

In addition to one or more of the features described above, or as an alternative, further embodiments of may include the controller is configured to detect when a mobile computing device is within a short-range wireless transmission range of the lock box and transmitting the alert to the mobile computing device when the mobile computing device is within the short-range wireless transmission range of the lock box.

In addition to one or more of the features described above, or as an alternative, further embodiments of may include the controller is configured to transmit the alert to a home computing device, the home computing device being configured to relay the alert to a mobile computing device via the internet.

In addition to one or more of the features described above, or as an alternative, further embodiments of may include the controller is configured to adjust an indicator light on the lock box based on the alert.

Technical effects of embodiments of the present disclosure include detecting tampering with a lock box using a force sensor on either the shackle of the lockbox or a mounting location for the lock box then activating an alert if tampering is detected.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments disclosed herein relate to an apparatus and method to detect lock shackle breakage or attempted breakage. While conventional lock boxes are tough and very difficult to damage or break, attempts are still made to remove the lock box from a door handle. The embodiments disclosed herein seek to provide a detection and alert system to detect when a lock box break-in is attempted and then transmit an alert.

Figure 1:
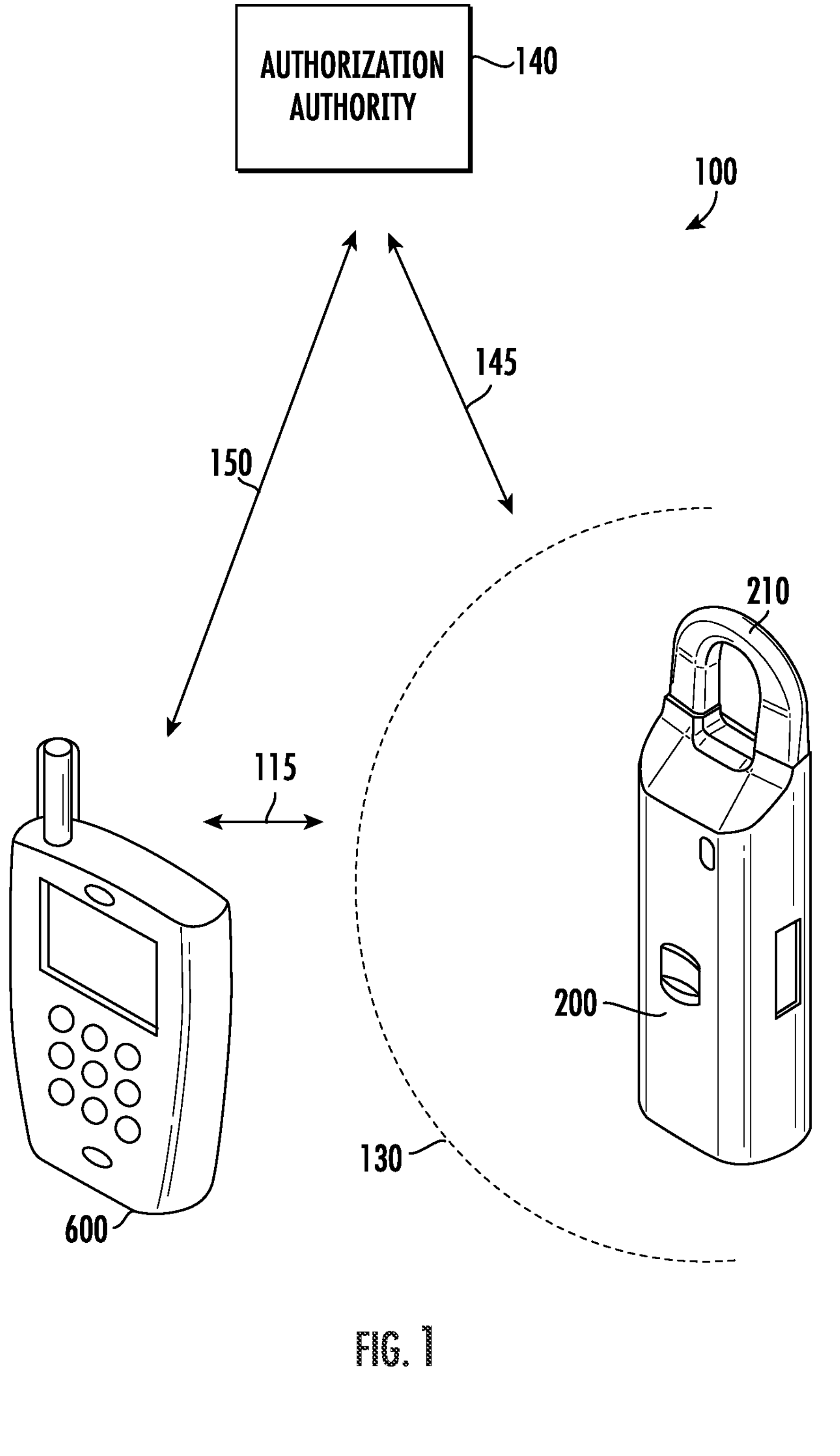
FIG. 1 is a schematic illustration of an exemplary lock box and access device, illustrating a remote authorization entity that may be linked to the lock box and/or the access device, according to an embodiment of the present disclosure.

FIG. 1 is schematic view of a representative restricted range lock box and access key system 100, according to an embodiment of the present disclosure. A lock box 200 with wireless communications capability is shown in relation to an access device, which in this example is a mobile computing device 600. The mobile computing device 600 may be a portable computing device that is typically carried by a person, such as, for example a phone, a smart phone, a PDA, a smart watch, a tablet, a laptop, or any other mobile computing device known to one of skill in the art.

The restricted range of the lock box 200 is shown schematically at 130. Thus, the mobile computing device 600 as shown in FIG. 1 is outside of the lock box's operating range 130, and would need to be moved within the range 130 to communicate with the lock box 200.

Communications between the lock box 200 and the mobile computing device 600 may be two-way, as indicated by the two-way arrow representing a communications link 115. The communications link 115 may be infrared, Bluetooth, Low-Energy Bluetooth, Near Field Communication (NFC), or any other similar communication method known to one of skill in the art. In some cases, one-way communication from the mobile computing device 600 to the lock box 200 may be sufficient.

All of the conventional lock box functions may be supported. For example, the communications from the mobile computing device 600 to the lock box 200 can include the ability for the user of the mobile computing device 600 to make an access request directed to the lock box 200. This access request may include communication of a credential indicating that the user is authorized for access.

In response, the lock box 200 may communicate a message, either via a display on the lock box or via a message transmitted to the mobile computing device 600, denying access. Access may be denied, e.g., if the user is unauthorized, if the user's credentials have expired, or if the access privileges have been superseded (e.g., if the property owner has overridden access privileges or is invoking the call before showing feature).

If access is granted, the lock box 200 allows the user to gain access to a storage area 290 (FIG. 2) in the lock box 200 or open a shackle 210 for removing the lock box 200 from an object to which it is attached (e.g., a door). In specific implementations, the lock box 200 has a circuit that controls a lock mechanism that secures the storage area 290 and shackle 210 in a locked condition when in use. When an access request is granted, the circuit unlocks the lock mechanism to provide the user access to the storage area 290, the shackle, or both. The internal components of the lock box 200 and the storage area 290 are protected from the external environment by an outer cover 202. The outer cover 202 may be composed of a tough durable material to prevent, or at least impede, someone from breaking into the lock box 200 and removing the key or the access card in the storage area 290.

Optionally, the access key system 100 may also include an authorization authority 140, which can be linked to the lock box 200 (via a link 145), or to the mobile computing device 600 (via the link 150) or to both the lock box 200 and the mobile computing device 600. The authorization authority can administer granting credentials to users, collect information on usage and activity and provide for updates to devices (lock boxes and access devices) in the access key system 100.

There are a number of possible ways to implement restricted range wireless communications by which the communicating devices are magnetically coupled. As only one example, the devices can be configured according to the Near Field Communication standards.

NFC is described as a standards based, short range wireless connectivity technology that enables simple and safe two-way interactions among appropriately configured electronic devices. Near Field Communication is based on inductive-coupling, where loosely coupled inductive circuits share power and data over a distance of a few centimeters. NFC devices share some similarities with proximity (13.56 MHz) RFID tags and contactless smartcards, but have a number of new features.

NFC is described as being fast, private, and easy as compared to other wireless standards. The NFC set-up time is less than 0.1 millisecond, which is much less than the Bluetooth set-up time of about 6 seconds and less than the IrDa set-up time of about 0.5 second. The NFC operating range is 10 cm or less, which is shorter and provides for more privacy than RFID (operating range up to 3 meters) and Bluetooth (up to 30 meters). At the same time, NFC is more convenient than IrDa which requires line of sight alignment for communication between devices, whereas NFC requires only that the devices be within the NFC operating range of each other. Thus, NFC is one communications technology ideally suited to implementing a restricted range lock box. In addition, RFID is largely limited to item tracking, and Bluetooth is comparatively more difficult to use because some configuration of the device is required.

NFC operates at 13.56 MHz and transfers data at up to 424 Kbits/second (current data rates are 106 kbps, 212 kbps and 424 kbps). The 13.56 MHz band is not currently regulated, so no license is required. NFC is both a "read" and "write" technology. NFC devices are unique in that they can change their mode of operation to be in reader/writer mode, peer-to-peer mode, or card emulation mode. In reader/writer mode, an NFC device is capable of reading NFC tag types, such as in the scenario of reading an NFC Smartposter tag. The reader/writer mode is on the RF interface compliant with the ISO 14443 and FeliCa schemes. In Peer-to-Peer mode, two NFC devices can exchange data. For example, Bluetooth or Wi-Fi link set up parameters can be shared, and/or data such as virtual business cards or digital photos can be exchanged. Peer-to-Peer mode is standardized on the ISO/IEC 18092 standard. In Card Emulation mode, the NFC device itself acts as an NFC tag (which is a passive device that stores data), appearing to an external reader much the same as a traditional contactless smart card. This enables, for example, contactless payments and eticketing.

Communication between two NFC-compatible devices occurs when they are brought within operating range of each other: a simple wave or touch of a device can establish an NFC connection, which is then compatible with other known wireless technologies such as Bluetooth or Wi-Fi. Because the transmission range is so short, NFC-enabled transactions are inherently secure. Also, the required physical proximity of one device to another is intuitive and gives users the reassurance of being in control of the process.

The underlying layers of NFC technology follow ISO/IEC (International Organization for Standardization/International Electrotechnical Commission, ECMA (European Telecommunications Standards Institute), and ETSI (European Telecommunications Standards Institute) standards. NFC compliant devices in the NFC Reader/Writer mode must support the RF requirements for ISO/IEC 14443A, ISO/IEC 14443 B and FeliCa as outlined in the relevant parts in the ISO 18092. As of this time, there are five published NFC specifications: Smart Poster Record Type Definition (RTD); Data Exchange Format; Record Type Definition; Text RTD and URI RTD. NFC devices are naturally interoperable, as NFC is based on pre-existing contactless payment and ticketing standards that are used on a daily basis by millions of people and devices worldwide. These standards determine not only the "contactless" operating environment, such as the physical requirements of the antennas, but also the format of the data to be transferred and the data rates for that transfer.

Because NFC components are generally smaller, the size of the access device can be kept small, which increases convenience. Also, the size of the lock box can be reduced.

It is understood that embodiments described herein are not limited to the communication link 115 between the lock box 200 and the mobile computing device 600 being NFC, and the embodiment described herein may be applicable to other communications links 115 between the lock box 200 and the mobile computing device 600 including but not limitation to infrared, Bluetooth, Low-Energy Bluetooth, or any other similar communication method known to one of skill in the art.

Figure 2:
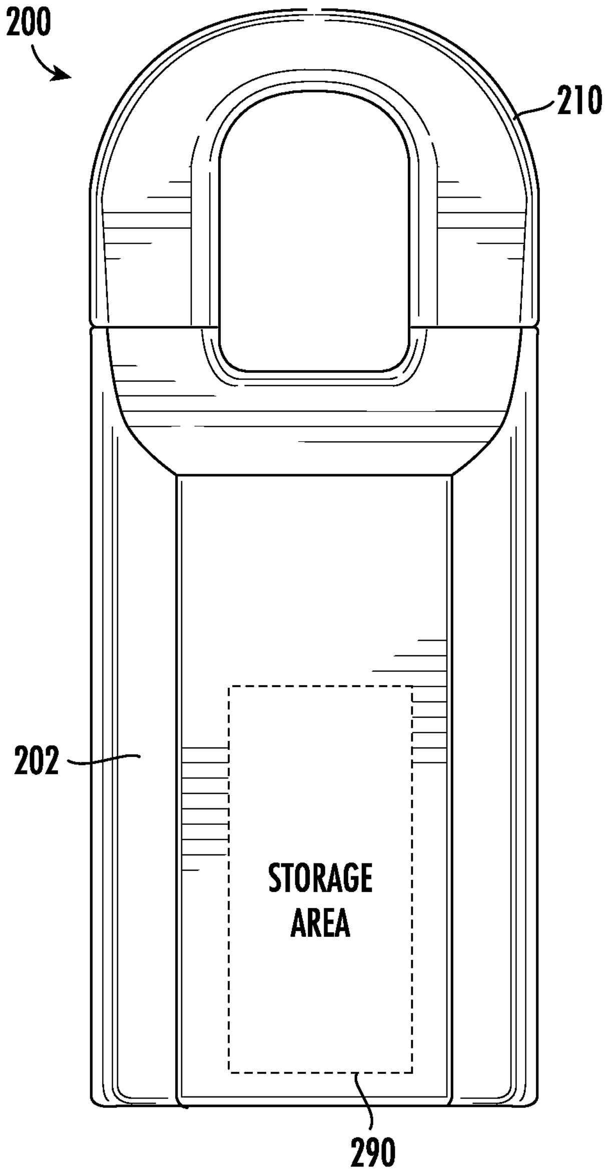
FIG. 2 is a schematic view of an exemplary lock box showing a storage area suitable for holding one or more property access tool (e.g., keys, access cards, or other access aids), according to an embodiment of the present disclosure.
Figure 3:
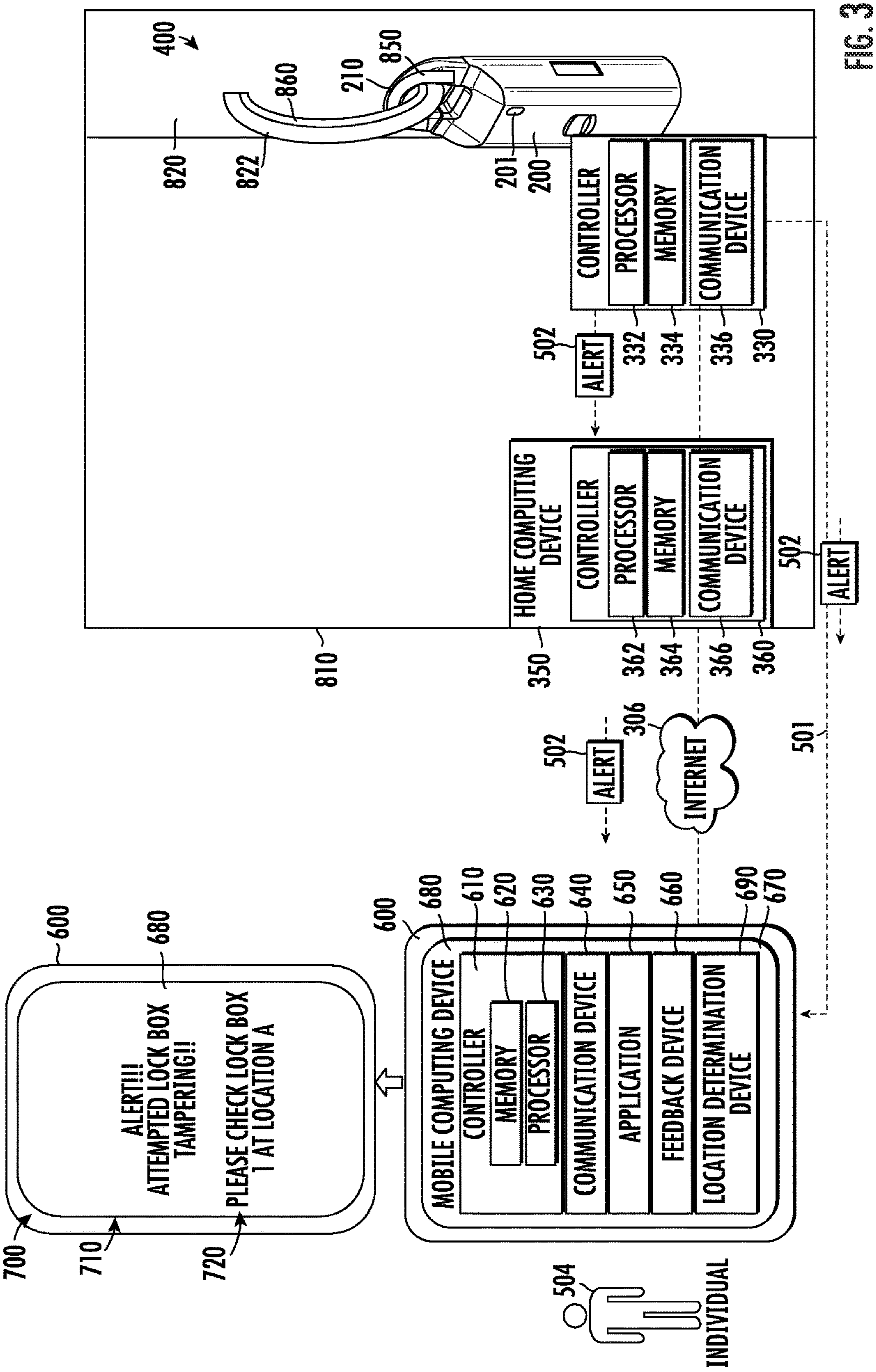
FIG. 3 illustrates a view of an exemplary breakage detection system for the lock box, according to an embodiment of the present disclosure.

Referring now to FIG. 3, with continued reference to FIGS. 1-2, a schematic illustration of a breakage detection system 400 for the lock box 200, according to an embodiment of the present disclosure.

The breakage detection system 400 is configured when a force greater than a selected magnitude is being applied to the shackle 210 and/or a mounting location 822 on which the shackle 210 is attached. In the embodiment illustrated in FIG. 3, the mounting location 822 is a door handle on a door 820 of the house 810. It is understood that while being illustrated and described herein mainly as a door handle, the mounting location 822 may be any other location on or around a property (e.g., house 810) on which the shackle 210 may be attached, such as, for example, a fence, window rods, fence gate, or any other conceivable structure on which the shackle 210 may be mounted The breakage detection system 400 includes a controller 320 for the lock box 200. The breakage detection system 400 also includes a shackle force sensor 850 and/or a mounting location force sensor 860. The breakage detection system 400 may also include a home computing device 350 and a computer application 650 for mobile computing device 600. The computer application 650 may be installed on the mobile computing device 600 or accessible to the mobile computing device, such as, for example, software-as-a-service or a website.

The shackle force sensor 850 may be attached to the shackle 210 or embedded within the shackle 210. The shackle force sensor 850 may be attached to the shackle 210 via an adhesive. The shackle force sensor 850 may be configured to detect a force on the shackle 210 and/or a breakage of the shackle 210. The shackle force sensor 850 may be configured to measure an amount of force on itself and the shackle 210 to distinguish between normal operation or an attempt to break the shackle 210 in order to remove the lock box 200 from a door 820 of a house 810. The shackle force sensor 850 is in communication with the controller 320 of the lock box 200 to transmit electric signals to the controller 320 indicating the amount of force on the shackle force sensor 850 and the shackle 210 itself. The communication between the controller 320 and the shackle force sensor 850 may be wired or wireless communication, such that there may or may not be a wired connection between the controller 320 and the shackle force sensor 850.

The shackle force sensor 850 may be a strip of sensors extending along a length of the shackle 210. In one embodiment, the shackle force sensor 850 may include a membrane force sensor that detects a change in applied force in a field of pressure measurements. In another embodiment, the shackle force sensor 850 may include a force-sensing resister that changes resistance based on the amount of pressure applied. In another embodiment, the shackle force sensor 850 may include a piezoresistive force sensor. In another embodiment, the shackle force sensor 850 may include a force sensing linear potentiometer.

The mounting location force sensor 860 may be attached to the mounting location 822 or embedded within the mounting location 822. The mounting location force sensor 860 may be attached to the handle 822 via an adhesive. The mounting location force sensor 860 may be configured to detect a force on itself and the mounting location 822 and/or a breakage of the mounting location 822. The mounting location force sensor 860 may be configured to measure an amount of force on the mounting location 822 to distinguish between normal operation or an attempt to break the mounting location 822 in order to remove the lock box 200 from a door 820 of a house 810. The mounting location force sensor 860 is in communication with the controller 320 of the lock box 200 to transmit electric signals to the controller indicating the amount of force on the mounting location force sensor 860 and the mounting location 822 itself. The communication between the controller 320 and the mounting location force sensor 860 may be wired or wireless communication, such that there may or may not be a wired connection between the controller 320 and the mounting location force sensor 860.

The mounting location force sensor 860 may be a strip of sensors extending along a length of the mounting location 822. In one embodiment, the mounting location force sensor 860 may include a membrane force sensor that detects a change in applied force in a field of pressure measurements. In another embodiment, the mounting location force sensor 860 may include a force-sensing resister that changes resistance based on the amount of pressure applied. In another embodiment, the mounting location force sensor 860 may include a piezoresistive force sensor. In another embodiment, the mounting location force sensor 860 may include a force sensing linear potentiometer.

The controller 330 of the lock box 200 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, Zigbee, NFC, Ultra-Wideband, Sub-GHz RF Channel, cellular, satellite, or any other wireless signal known to one of skill in the art. The controller 330 is configured to communicate with a computer application 650 of the mobile computing device 600 using the communication device 336. The controller 330 may be configured to communicate with the computer application 650 through the internet 306 and/or directly with the mobile computing device 600 through short-range wireless transmissions 501, such as, for example, Bluetooth, NFC, Ultra-Wideband, Zigbee, or any other wireless technology. The communication device 336 may be connected to the internet 306 through a Wi-Fi router or home automation system (not shown).

The home computing device 350 may an Internet of things (IoT) connected device capable of communication with the internet 306 and the controller 330 of the lock box 200. The home computing device may be any appliance, consumer device, home security system, or virtual smart assistance devices (e.g., Google Home or Amazon Alexa). The home computing device 350 may be configured to receive alerts 502 from the lock box 200 through a short range wireless signal and then transmit those alerts 502 to a mobile computing device 600 through the internet 306.

The controller 360 of the home computing device 350 may be an electronic controller including a processor 362 and an associated memory 364 comprising computer-executable instructions (i.e., computer program product) that, when executed by the processor 362, cause the processor 362 to perform various operations. The processor 362 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 364 may be but is not limited to a random access memory (RAM), read only memory (ROM), or other electronic, optical, magnetic or any other computer readable medium.

The controller 360 also includes a communication device 366. The communication device 366 may be capable of wireless communication including but not limited to Wi-Fi, Bluetooth, Zigbee, NFC, Ultra-Wideband, Sub-GHz RF Channel, cellular, satellite, or any other wireless signal known to one of skill in the art. The controller 360 is configured to communicate with a computer application 650 of the mobile computing device 600 using the communication device 366. The controller 360 may be configured to communicate with the computer application 650 through the internet 306. The controller 360 may be configured to communicate directly with the lockbox 200 through short-range wireless transmissions 501, such as, for example, Bluetooth, NFC, Ultra-Wideband, Zigbee, or any other wireless technology. The communication device 366 may be connected to the internet 306 through a Wi-Fi router (not shown).

The mobile computing device 600 may belong to an individual 504 that is in charge of or is managing the lock box 200. The individual 504 may be a real-estate agent of a buyer of the house 810, a real-estate agent of a seller of the house 810, or an owner (e.g., a seller) of the house 810. The individual 504 is authorized to actuate the lock box 200 to obtain the property access tool 402 and gain access to the real-estate property for the showing.

The mobile computing device 600 includes a controller 610 configured to control operations of the mobile computing device 600. The controller 610 may be an electronic controller including a processor 630 and an associated memory 620 comprising computer-executable instructions (i.e., computer program product) that, when executed by the processor 630, cause the processor 630 to perform various operations. The processor 630 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 620 may be but is not limited to a random access memory (RAM), read only memory (ROM), or other electronic, optical, magnetic or any other computer readable medium.

The mobile computing device 600 includes a communication device 640 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the mobile computing device 600 may be connected to the internet 306 through a hardwired connection. The mobile computing device 600 may configured to communicate with the communication device 336 of the lock box 200 through the internet 306 or directly through short-range wireless transmissions 501.

The mobile computing device 600 may include a display device 680, such as for example a computer display, an LCD display, an LED display, an OLED display, a touchscreen of a smart phone, tablet, or any other similar display device known to one of the skill in the art. A user operating the mobile computing device 600 is able to view the computer application 650 through the display device 680.

The mobile computing device 600 includes an input device 670 configured to receive a manual input from a user (e.g., human being) of computing device 600. The input device 670 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the mobile computing device 600, or any similar input device known to one of skill in the art. The user operating the mobile computing device 600 is able to enter data into the computer application 650 through the input device 670. The input device 670 allows the user operating the mobile computing device 600 to data into the computer application 650 via a manual input to input device 670. For example, the user may respond to a prompt on the display device 680 by entering a manual input via the input device 670. In one example, the manual input may be a touch on the touchscreen. In an embodiment, the display device 680 and the input device 670 may be combined into a single device, such as, for example, a touchscreen.

The mobile computing device 600 device may also include a feedback device 660. The feedback device 660 may activate in response to a manual input via the input device 670. The feedback device 660 may be a haptic feedback vibration device and/or a speaker emitting a sound. The feedback device 660 may activate to confirm that the manual input entered via the input device 670 was received via the computer application 650. For example, the feedback device 660 may activate by emitting an audible sound or vibrate the mobile computing device 600 to confirm that the manual input entered via the input device 670 was received via the computer application 650.

The mobile computing device 600 may also include a location determination device 690 that may be configured to determine a location of the mobile computing device 600 using cellular signal triangulation, a global positioning system (GPS), or any location termination method known to one of skill in the art.

The shackle force sensor 850 is configured to detect a magnitude of a force applied to the shackle force sensor 850 and transmit the magnitude of the force to the controller 330. The magnitude of the force applied to the shackle force sensor 850 will be about equivalent to a magnitude of a force applied to the shackle 210 itself because of the location and placement of the shackle force sensor 850. The controller 330 is configured to analyze the magnitude of the force received from the shackle force sensor 850 and if the magnitude exceeds a selected magnitude than it may indicate that someone is trying to break the shackle 210. The controller 330 is configured to transmit an alert 502 if the magnitude exceeds a selected magnitude.

Similarly, the mounting location force sensor 860 is configured to detect a magnitude of a force applied to the mounting location force sensor 860 and transmit the magnitude of the force to the controller 330. The magnitude of the force applied to the mounting location force sensor 860 will be about equivalent to a magnitude of a force applied to the mounting location 822 itself because of the location and placement of the mounting location force sensor 860. The controller 330 is configured to analyze the magnitude of the force received from the mounting location force sensor 860 and if the magnitude exceeds a selected magnitude than it may indicate that someone is trying to break the mounting location 822. The controller 330 is configured to transmit an alert 502 if the magnitude exceeds a selected magnitude.

The alert 502 may be transmitted to the home computing device 350, which is configured to relay the alert 502 through the internet 306 to the application 650 of the mobile computing device 600 to alert the individual 504 that someone is trying to break or is tampering with the shackle 210 of the lock box 200 or the mounting location 822. The alert 502 may alternatively be saved and then transmitted directly to the mobile computing device 600 via a short-range wireless transmission 501 when the mobile computing device 600 is within range of the controller 330. The alert 502 may generate a message 710 to be displayed on the display device 680 of the mobile computing device 600. The message 710 may state "ALERT!!Attempted Lock box tampering!!" or a similar message. The message 710 may also include identification information 720 for the lock box 200, which advantageously would help if the individual 504 is managing multiple lock boxes 200. The identification information 720 may include a name or number of a lock box 200 and a location of the lock box 200. The alert 502 may also specify whether the mounting location 822 or the shackle 210 is being attacked. The alert 502 may also be able to vibrate the mobile computing device 600 and/or activate an audible alarm on the mobile computing device 600, via the feedback device 660. The alert 502 may also adjust an indicator light 201 on the lock box. The indicator light 201 may be adjust to change color or blink to indicate that someone has tried to tamper with the lock box 200.

Figure 4:
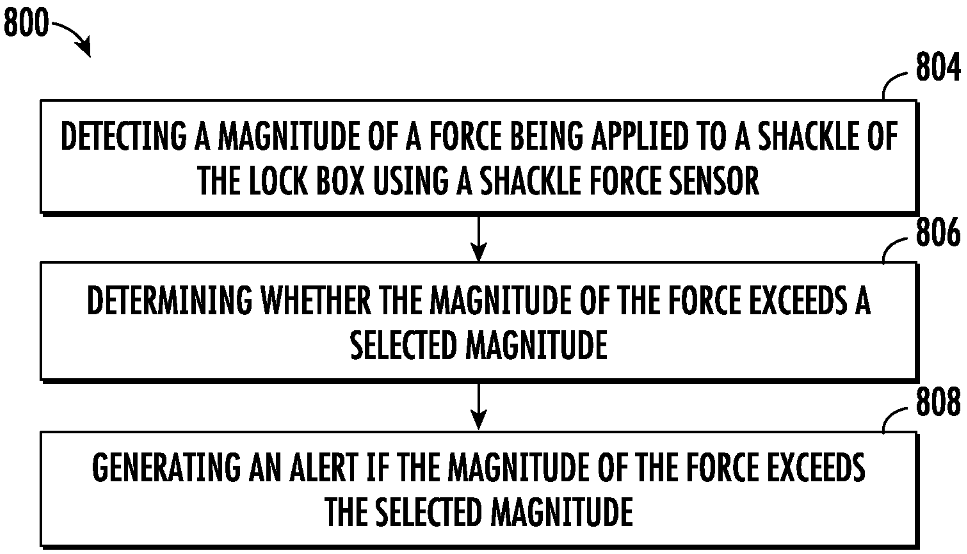
FIG. 4 is a flow process illustrating an exemplary method of monitoring a lock box, according to an embodiment of the present disclosure.

Referring to FIG. 4, within continued references to FIGS. 1-3, a flow diagram illustrating a method 800 of monitoring a lock box 200 illustrated, in accordance with an embodiment of the present disclosure.

At block 804, a magnitude of a force being applied to a shackle 210 of the lock box 200 is detected using a shackle force sensor 850. In one embodiment, the shackle force sensor 850 may be embedded in the shackle 210. In another embodiment, the shackle force sensor 850 may be attached to the shackle 210.

At block 806, it is determined whether the magnitude of the force exceeds a selected magnitude. The selected magnitude being a predetermined force that indicates an individual is tampering with the shackle 210. At block 808, an alert 502 is generated if the magnitude of the force exceeds a selected magnitude.

The method 800 may further include that the alert 502 is transmitted to a mobile computing device 600. The method 800 may also include that it is detected when the mobile computing device 600 is within a short-range wireless transmission range of the lock box 200 and then the alert 502 to the mobile computing device 600 is transmitted when the mobile computing device 600 is within the short-range wireless transmission range of the lock box 200.

The method 800 may alternatively include that the alert 502 is transmitted to a home computing device 350 and the home computing device 350 is configured to relay the alert 502 to a mobile computing device 600 via the internet 306. The method 800 may yet further include that an indicator light 201 on the lock box 200 is adjusted based on the alert 502.

While the above description has described the flow process of FIG. 4 in a particular order, it should be appreciated that unless otherwise specifically required in the attached claims that the ordering of the steps may be varied.

Figure 5:
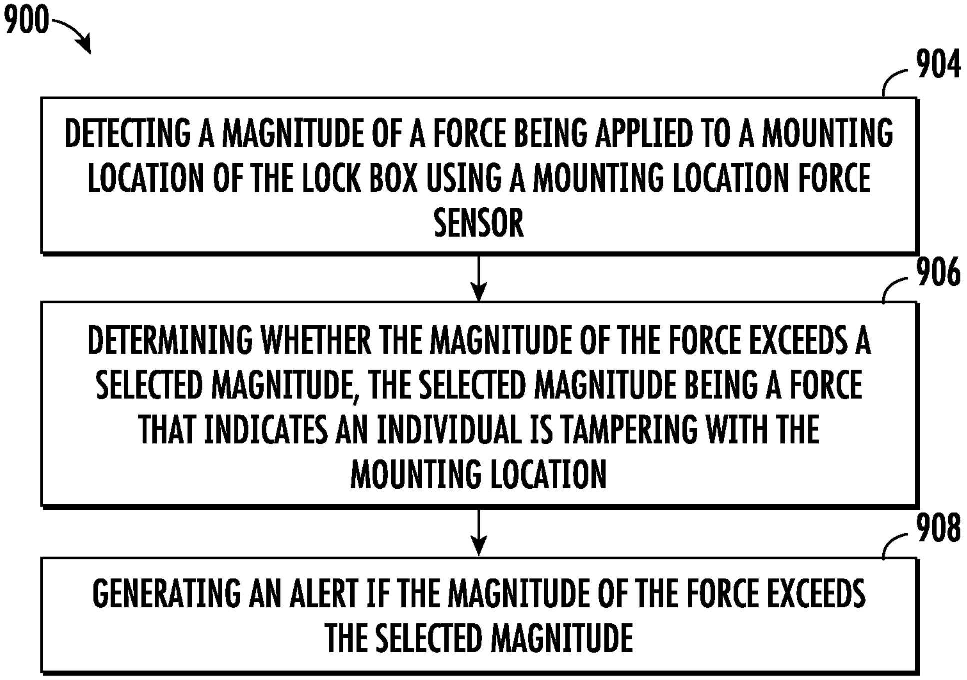
FIG. 5 is a flow process illustrating an exemplary method of monitoring a lock box, according to an embodiment of the present disclosure.

Referring to FIG. 5, within continued references to FIGS. 1-4, a flow diagram illustrating a method 900 of monitoring a lock box 200 illustrated, in accordance with an embodiment of the present disclosure.

At block 904, a magnitude of a force being applied to a mounting location 822 of the lock box 200 is detected using a mounting location force sensor 860. In one embodiment, the mounting location force sensor 860 may be embedded in the mounting location 822. In another embodiment, the mounting location force sensor 860 may be attached to the mounting location 822. In an embodiment, the mounting location 822 is a door handle.

At block 906, it is determined whether the magnitude of the force exceeds a selected magnitude. The selected magnitude being a predetermined force that indicates an individual is tampering with the mounting location 822. At block 908, an alert 502 is generated if the magnitude of the force exceeds a selected magnitude.

The method 900 may further include that the alert 502 is transmitted to a mobile computing device 600. The method 900 may also include that it is detected when the mobile computing device 600 is within a short-range wireless transmission range of the lock box 200 and then the alert 502 to the mobile computing device 600 is transmitted when the mobile computing device 600 is within the short-range wireless transmission range of the lock box 200.

The method 900 may alternatively include that the alert 502 is transmitted to a home computing device 350 and the home computing device 350 is configured to relay the alert 502 to a mobile computing device 600 via the internet 306. The method 900 may yet further include that an indicator light 201 on the lock box 200 is adjusted based on the alert 502.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a lock box, the method comprising:

detecting a magnitude of a force being applied to a shackle of the lock box using a shackle force sensor;

determining whether the magnitude of the force exceeds a selected magnitude, the selected magnitude being a predetermined force that indicates an individual is tampering with the shackle; and generating an alert if the magnitude of the force exceeds the selected magnitude;

wherein the shackle force sensor is a strip sensor attached to the shackle via an adhesive.

2. The method of claim 1, further comprising:

transmitting the alert to a mobile computing device.

3. The method of claim 1, further comprising:

detecting when a mobile computing device is within a short-range wireless transmission range of the lock box; and transmitting the alert to the mobile computing device when the mobile computing device is within the short-range wireless transmission range of the lock box.

4. The method of claim 1, further comprising:

transmitting the alert to a home computing device, the home computing device being configured to relay the alert to a mobile computing device via the internet.

5. The method of claim 1, further comprising:

adjusting an indicator light on the lock box based on the alert.

6. A method of monitoring a lock box, the method comprising:

detecting a magnitude of a force being applied to a mounting location of the lock box using a mounting location force sensor;

determining whether the magnitude of the force exceeds a selected magnitude, the selected magnitude being a predetermined force that indicates an individual is tampering with the mounting location; and generating an alert if the magnitude of the force exceeds the selected magnitude;

wherein the mounting location force sensor is a strip sensor attached to the mounting location via an adhesive.

7. The method of claim 6, further comprising:

transmitting the alert to a mobile computing device.

8. The method of claim 6, further comprising:

detecting when a mobile computing device is within a short-range wireless transmission range of the lock box; and transmitting the alert to the mobile computing device when the mobile computing device is within the short-range wireless transmission range of the lock box.

9. The method of claim 6, further comprising:

transmitting the alert to a home computing device, the home computing device being configured to relay the alert to a mobile computing device via the internet.

10. The method of claim 6, further comprising:

adjusting an indicator light on the lock box based on the alert.

11. The method of claim 6, wherein the mounting location is a door handle.

12. A breakage detection system for a lock box, the breakage detection system comprising:

a shackle force sensor attached to a shackle of the lock box, the shackle force sensor being configured to detect a magnitude of a force being applied to a shackle of the lock box;

a controller configured to determine whether the magnitude of the force exceeds a selected magnitude, the selected magnitude being a predetermined force that indicates an individual is tampering with the shackle, wherein the controller is configured to generate an alert if the magnitude of the force exceeds the selected magnitude;

wherein the shackle force sensor is a strip sensor attached to the shackle via an adhesive.

13. The breakage detection system of claim 12, wherein the controller is configured to transmit the alert to a mobile computing device.

14. The breakage detection system of claim 12, wherein the controller is configured to detect when a mobile computing device is within a short-range wireless transmission range of the lock box and transmitting the alert to the mobile computing device when the mobile computing device is within the short-range wireless transmission range of the lock box.

15. The breakage detection system of claim 12, wherein the controller is configured to transmit the alert to a home computing device, the home computing device being configured to relay the alert to a mobile computing device via the internet.

16. The breakage detection system of claim 12, wherein the controller is configured to adjust an indicator light on the lock box based on the alert.

* * * * *